UNITED STATES PATENT OFFICE.

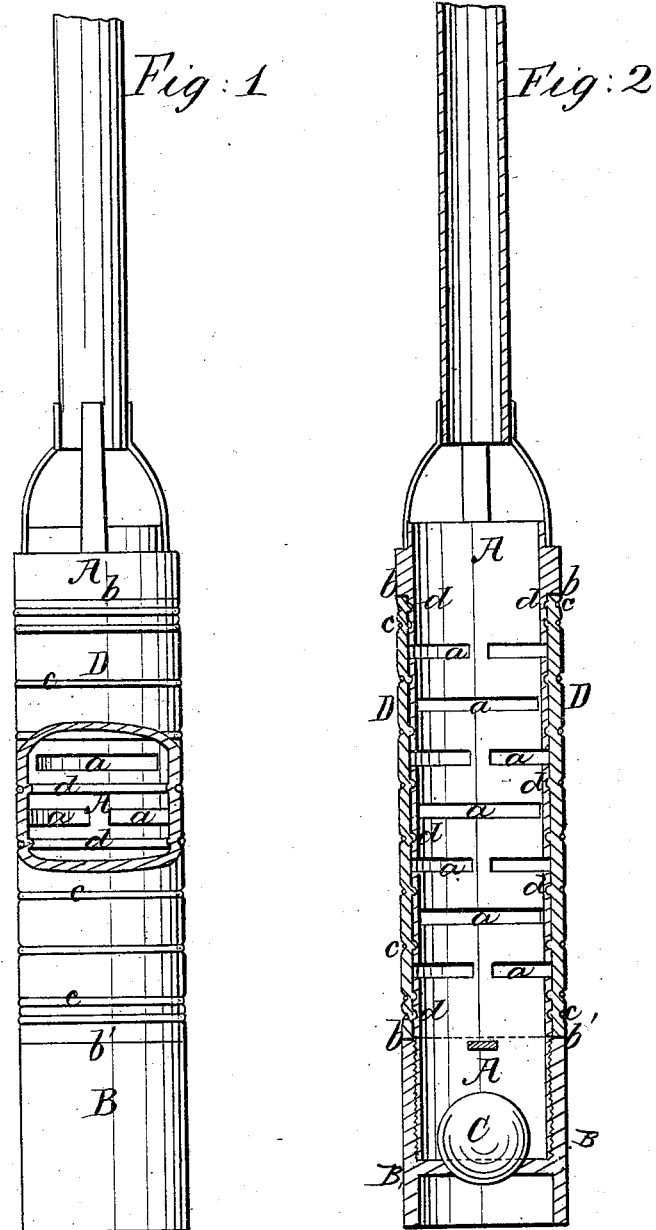

WM. FOSTER DODGE, OF NEW YORK, N. Y.

IMPROVEMENT IN PUMP-PISTONS.

Specification forming part of Letters Patent No. 47,095, dated April 4, 1865.

*To all whom it may concern:*

Be it known that I, W. FOSTER DODGE, of Newburg, in the county of Orange and State of New York, have invented a new and useful Improvement in Pistons for Pumps; and I do hereby declare that the following is a full, clear, and exact description of the same, reference being had to the accompanying drawings, forming part of this specification, in which—

Figure 1 is a side view of an oil-pump piston with my improved packing. Fig. 2 is a central section of the same.

Similar letters of reference indicate corresponding parts in both figures.

This invention consists in a novel construction of a pump-piston, whereby the packing is pressed outward against the interior of the cylinder by the pressure of the water or other fluid.

To enable others skilled in the art to make and apply my invention, I will proceed to describe it with reference to the drawings.

A is a hollow cylindrical shell of metal having numerous openings *a a* in its sides. B is the valve-seat, screwed or otherwise secured to the bottom of the shell A. C is the valve. D is a packing-band, of leather or other elastic or flexible material, surrounding the exterior of the shell A, and confined in a longitudinal direction between a shoulder, *b*, on the upper part of the shell A, and a shoulder, *b'*, on the valve-seat. The band is also secured to the shell A by a suitable number of surrounding rings, *c c*, each formed by bending a piece of copper or other wire around the band, drawing it tight and twisting the ends together, the said rings being applied opposite to grooves *d d* in the exterior of the shell, and drawing the band D into the said grooves and indenting or countersinking themselves within its exterior surface in such manner as to permit the said band to fit the bore of the cylinder without themselves coming into contact therewith. The object of these rings is to prevent the buckling of the packing-band by the friction of the said band within the cylinder in the working of the piston. The said rings are, however, only necessary, and in fact can only be used when the band is of leather or other soft material, and when used they should be applied between the openings *a a*, so as not to interfere with the pressure of the water or liquid through the said openings against the interior of the packing-band D.

In the operation of the pump, the valve C being at the bottom of the piston and below the openings *a a* and packing-band D, the interior of the said band is subject to the outward pressure of the whole column of water or other fluid above, and is thereby pressed outward or expanded against the bore of the cylinder and kept perfectly tight therein, notwithstanding the wear of its outer surface, which is constantly taking place, the packing remaining good until worn entirely through, when it can be easily renewed.

The openings *a a* may be arranged vertically, instead of horizontally, or may consist merely of a series of small holes. The packing-band D may be of metal or hard material, made thin enough to give it the requisite degree of elasticity or flexibility, to enable it to be pressed or expanded outward into contact with the cylinder by the weight of the column of fluid above. Such a band, whether made of soft or hard material, may be made to work with less friction than an ordinary packing, as, though always kept in perfectly close contact with the bore of the cylinder, it need not fit so tight as ordinary packing commonly does when newly applied or adjusted.

What I claim as my invention, and desire to secure by Letters Patent, is—

1. The expanding band D, in combination with the shell A, having a series of openings through which the pressure of the column of water or other fluid acts against the interior of the said band, substantially as and for the purpose herein specified.

2. A piston composed of a hollow shell, A, having openings *a a* in its sides and a valve-seat and valve at or near its bottom, and a surrounding band of leather or other soft elastic or flexible material confined to the said shell between the said openings by means of rings *c c*, the whole combined substantially as and for the purpose herein specified.

WM. FOSTER DODGE.

Witnesses:
J. W. COOMBS,
GEO. W. REED.